US012745751B2

(12) United States Patent
Osborne

(10) Patent No.: US 12,745,751 B2
(45) Date of Patent: Sep. 29, 2026

(54) PET COMFORT STATION FOR DOGS

(71) Applicant: Leonard Lewis Osborne, Savannah, GA (US)

(72) Inventor: Leonard Lewis Osborne, Savannah, GA (US)

( * ) Notice: Subject to any disclaimer, the term of this patent is extended or adjusted under 35 U.S.C. 154(b) by 0 days.

(21) Appl. No.: 18/981,226

(22) Filed: Dec. 13, 2024

(65) Prior Publication Data

US 2025/0194565 A1 Jun. 19, 2025

Related U.S. Application Data

(60) Provisional application No. 63/611,587, filed on Dec. 18, 2023.

(51) Int. Cl.
*A01K 13/00* (2006.01)

(52) U.S. Cl.
CPC .................................. *A01K 13/004* (2013.01)

(58) Field of Classification Search
CPC .................. A01K 13/004; A01K 29/00; A46B 2200/1093; A46B 3/18; E06B 7/32
USPC ............... 119/702, 622, 664; 15/160; 185/3; 49/168, 505
See application file for complete search history.

(56) References Cited

U.S. PATENT DOCUMENTS 1,800,602 A * 4/1931 Cole .................... A01K 13/004 119/658
2,865,329 A * 12/1958 Elliott .................. A01K 13/004 119/622
4,872,422 A * 10/1989 Della Vecchia ..... A01K 13/004 119/621
5,176,105 A * 1/1993 Madden ............... A01K 13/004 119/702
5,458,088 A * 10/1995 Owens ................. A01K 13/002 119/622
5,517,946 A * 5/1996 Udelle ................. A01K 13/004 119/622
6,272,793 B1 * 8/2001 Davlantes ................. E06B 7/32 49/501
6,837,186 B1 * 1/2005 Terao ................... A01K 15/027 119/701
7,000,569 B2 * 2/2006 Markowitz .......... A01K 1/0107 119/482
8,272,998 B2 * 9/2012 Macartney ........... A01K 15/027 119/702
8,430,062 B2 * 4/2013 Lu .......................... A01K 1/035 119/482
8,875,661 B2 * 11/2014 Russell .................... A63K 1/02 119/702
11,083,171 B1 * 8/2021 Brooks ................ A01K 13/004
2003/0209209 A1 * 11/2003 Udelle ................. A01K 13/004 119/609
2007/0039558 A1 * 2/2007 Hensley ............... A01K 15/024 119/621

(Continued)

*Primary Examiner* — Zoe Tam Tran
(74) *Attorney, Agent, or Firm* — The Rapacke Law Group, P.A.; Andrew S. Rapacke; Kenneth F. Brooks

(57) ABSTRACT

The Pet Comfort Station for Dogs is a manual self-activated device for dogs. It will comfort, message, and calm the pet dog as it walks through the adjustable comfort rollers on the top and both sides of the device. No other prior art provides the pet dog with the ability to mimic being rubbed on the top and both sides of the dog's body. The invention will allow dogs to soothe themselves while the owner is away from the home for extended periods.

20 Claims, 11 Drawing Sheets

(56) References Cited

U.S. PATENT DOCUMENTS

| | | | | |
|---|---|---|---|---|
| 2007/0245975 | A1* | 10/2007 | Udelle | A01K 13/004 119/600 |
| 2009/0032046 | A1* | 2/2009 | Gueret | A45D 40/267 15/160 |
| 2010/0077961 | A1* | 4/2010 | Lipscomb | A01K 15/02 119/702 |
| 2010/0154719 | A1* | 6/2010 | Kellogg | A01K 15/024 119/702 |
| 2015/0257361 | A1* | 9/2015 | Murphy | A01K 13/002 119/621 |
| 2015/0359193 | A1* | 12/2015 | Frost | A01K 13/004 119/702 |
| 2017/0159353 | A1* | 6/2017 | Clifton | E05C 19/16 |
| 2018/0279756 | A1* | 10/2018 | Axelrod | A46B 7/02 |
| 2020/0040650 | A1* | 2/2020 | Harrington | A01K 13/002 |
| 2020/0307310 | A1* | 10/2020 | Haller | B60B 33/0049 |

* cited by examiner

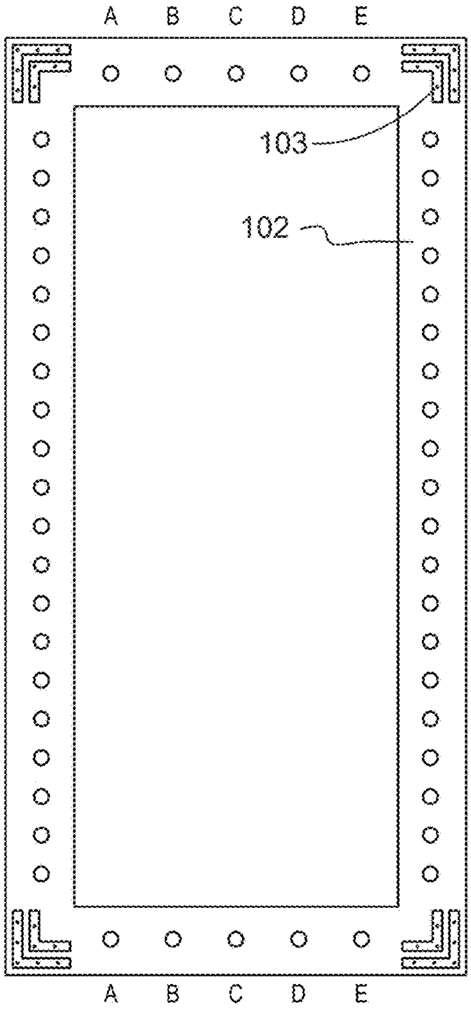
FIG. 1C
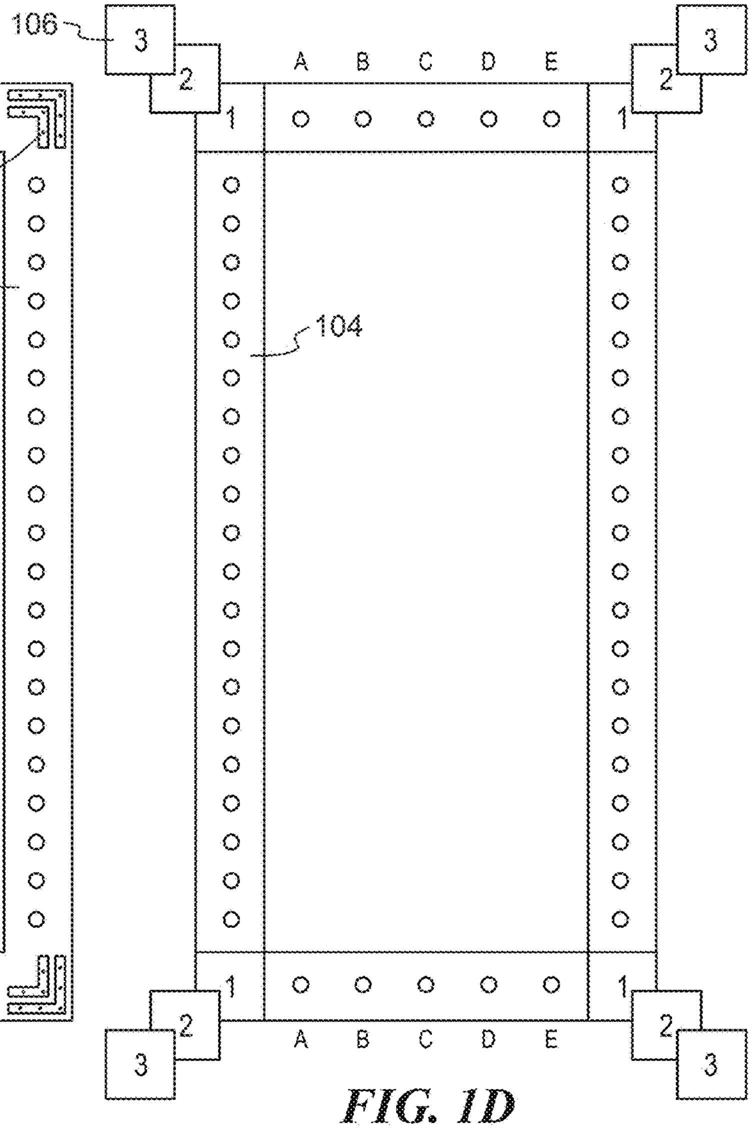
FIG. 1D
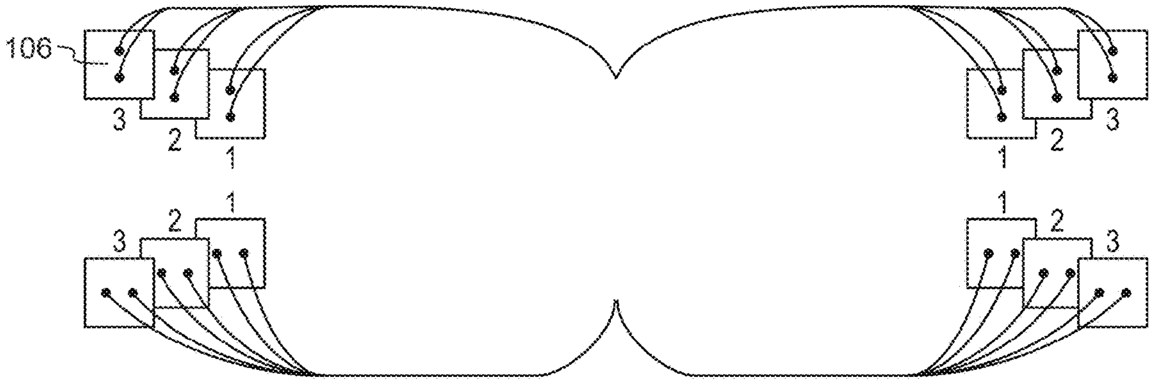

PET COMFORT STATION FOR DOGS

STATEMENT REGARDING FEDERALLY SPONSORED RESEARCHER DEVELOPMENT

"Not Applicable"

REFERENCE TO SEQUENCE LISTING, A TABLE, OR A COMPUTER PROGRAM LISTING COMPACT DISC APPENDIX

"Not Applicable"

BACKGROUND OF THE INVENTION

No prior art was discovered relating to a pet comfort station for dogs. Pets are typically left at home by their owners for extended periods of time due to work obligations.

The device would mimic a person rubbing the dog's fur or the top and both sides of the dog's body. The device could also provide a piece of mind for the pet owner.

BRIEF SUMMARY OF THE INVENTION

The design of the Pet Comfort Station enhances the care and comfort for your pet dog. The device would be self-activated as the dog walks through the station.

Various size adjustable rollers for the dog's height and width pass over the top and sides of the dog's body. The rotating rollers of the device will soothe, calm, and ultimately comfort the dog while the owner is away. The invention is adjustable in height and width to accommodate various dog sizes.

BRIEF DESCRIPTION OF SEVERAL VIEWS OF THE DRAWINGS

FIGS. 1A-1F depicts a perspective view of the complete assembled Pet Comfort Station showing all major components including frames, metal L-shaped frame brackets, cork pieces (A-E), wooden corner blocks (1-4), and caster wheels.

DETAILED DESCRIPTION OF THE INVENTION

Figure 1A:
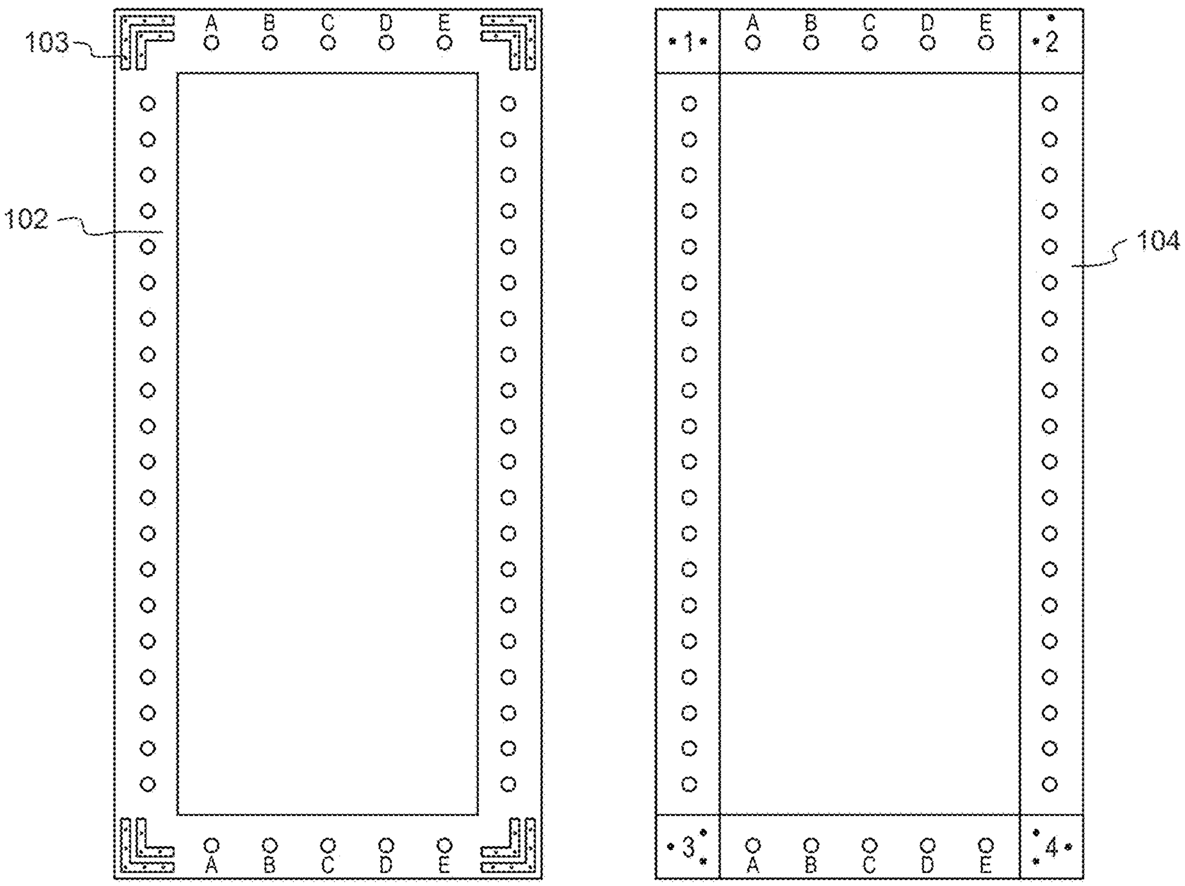

The Pet Comfort Station for Dogs is an innovative device designed to provide comfort and soothing to dogs when their owners are away for extended periods. The device mimics the sensation of a person rubbing or petting the dog's fur along the top and sides of the body, offering physical comfort and emotional reassurance to the pet.

The Pet Comfort Station consists of a rectangular frame structure comprising a top frame and a bottom frame, each constructed from wooden components. Both the top and bottom frames measure six feet in length, 26.5 inches in width, and one inch in thickness. These frames form the primary structural foundation of the device and are positioned parallel to one another, with the top frame elevated above the bottom frame to create a passageway through which the dog can walk.

The top and bottom frames are connected and supported by four vertical L-shaped wooden corner pieces. Each vertical corner piece measures 30 inches in length, 3 inches in width, and 1 inch in thickness. These corner pieces provide structural stability to the device while maintaining the proper spacing between the top and bottom frames. The L-shaped configuration of these corners creates a rectangular opening that serves as the entrance and exit points for the dog.

Each corner of both the top and bottom frames is reinforced with wooden blocks and metal L-shaped brackets to ensure structural integrity. The top frame features four wooden blocks, one positioned at each corner, with each block measuring 5.5 inches in length, 2.5 inches in width, and 1 inch in thickness. These blocks are secured to the top surface of the frame corners using Phillips flathead screws that are 1.5 inches long and 0.25 inches thick.

The bottom frame employs a more robust support system with three wooden blocks per corner on the top side of the frame, totaling twelve blocks. Each block shares the same dimensions as those on the top frame: 5.5 inches long, 2.5 inches wide, and 1 inch thick. These blocks are secured using Phillips flathead screws measuring 3.5 inches in length and 0.25 inches in thickness.

Additionally, the bottom frame features two wooden blocks per corner on the underside, totaling eight blocks that rest on the ground. These blocks have identical dimensions to the upper blocks and are secured with 3-inch-long Phillips flathead screws that are 0.25 inches thick.

Metal L-shaped brackets provide additional reinforcement at each corner of both frames. Each corner contains one 2.5-inch L-bracket and one 2-inch L-bracket on both the front and back sides. These brackets are secured with 0.5-inch-long screws that are 0.125 inches thick, with four screws per bracket. In total, thirty-two screws secure the metal L-shaped brackets to each side of both the top and bottom frames, amounting to sixty-four screws total per frame.

The vertical L-shaped wooden corner pieces are attached to both the top and bottom frames using additional metal L-shaped brackets. Five 2.5-inch L-shaped brackets per corner support each vertical wooden corner, secured with twenty 0.25-inch screws per corner. The vertical corners themselves are fastened to the frame blocks using Phillips flathead screws measuring 0.5 inches in length and 0.25 inches in thickness, with two screws securing each corner to the top frame and two screws securing each corner to the bottom frame.

To facilitate movement of the Pet Comfort Station, the device is equipped with four rubber caster wheels mounted to the underside of the bottom frame. These wheels are attached to wooden block number two on the ground side of each corner. Each caster wheel features a swivel mechanism and includes a locking device or brake to prevent unwanted movement when the device is in use.

The caster wheels have a flat metal mounting surface containing four screw holes. Each wheel is secured to its respective wooden block using Phillips flathead screws measuring 4.5 inches in length and 0.25 inches in thickness.

A key feature of the Pet Comfort Station is its adjustability to accommodate dogs of various sizes. This is accomplished through a system of six adjustable wooden pieces that can be repositioned to modify both the height and width of the device.

Each adjustable wooden piece measures six feet in height, three inches in width, and one inch in thickness. Every adjustable piece contains twenty evenly-spaced holes measuring 0.75 inches in diameter. The holes at each end of the adjustable pieces are specifically designed to accommodate cork mounting pieces that connect to the top and bottom frames.

Four of these adjustable wooden pieces (numbered 1, 2, 3, and 4) control the width of the device. Adjustable pieces 1 and 3 are associated with the top frame, while pieces 2 and 4 are associated with the bottom frame. These pieces can be moved inward toward the center of the device to decrease the width, or outward to increase it, accommodating dogs of varying body widths.

The remaining two adjustable wooden pieces (numbered 5 and 6) form the sides of the device and control the height of the top roller brushes. These side pieces can be repositioned vertically to raise or lower the top comfort rollers, ensuring proper contact with dogs of different heights.

The adjustment system relies on cork pieces that serve as mounting points for the adjustable wooden pieces. The top and bottom frames each feature five cork mounting locations, labeled A through E. At each location, two cork pieces are positioned, with each cork piece measuring 1 inch in height and 0.75 inches in circumference.

Each cork location utilizes a Phillips flathead screw measuring 2.5 inches in length and 0.25 inches in thickness that passes through the center of the cork pieces. A 0.25-inch nut secures the screw and cork assembly from the visible side of the frame. This creates ten total screw-and-cork assemblies on each frame.

Similarly, the vertical L-shaped wooden corner pieces contain cork mounting points for the side adjustable pieces (numbers 5 and 6). These corners feature five cork locations (labeled F through J) on the inside surface of each L-shaped corner. Each location contains two cork pieces with the same dimensions as those on the top and bottom frames: 1 inch high and 0.75 inches in circumference. The cork assemblies are secured with 2.5-inch-long screws and 0.25-inch nuts.

By positioning the adjustable wooden pieces at different cork locations, users can modify the device's dimensions. For maximum height, adjustable pieces 5 and 6 are placed at cork location F, while positioning them at cork location J provides the minimum height. Similarly, moving the width-adjusting pieces (1, 2, 3, and 4) between cork locations A through E allows for width adjustment.

The comfort roller brushes that provide the soothing sensation to the dog are mounted on PVC pipes that extend between pairs of adjustable wooden pieces. The adjustable pieces contain twenty holes, each measuring 0.75 inches in diameter, designed to accept 0.75-inch diameter PVC pipes.

For width adjustment, twenty PVC pipes extend vertically between adjustable wood pieces 1 and 2 on one side, and between pieces 3 and 4 on the other side. Each of these PVC pipes measures 33.5 inches in length and 0.75 inches in diameter, inserting into the corresponding holes in the adjustable wooden pieces.

For the top of the device, twenty PVC pipes extend between adjustable wood pieces 5 and 6 horizontally, which form the sides. These pipes measure 32 inches in length and 0.75 inches in diameter.

Each PVC pipe is secured at both ends with PVC caps that fit over the pipe ends. These caps serve dual purposes: they hold the adjustable wooden pieces in position relative to the pipes, and they contain the roller brushes within the pipe section.

The primary comfort-providing elements of the device are specialized roller brushes mounted on each PVC pipe. These roller brushes are similar in design to paint roller brushes and are designed to rotate freely on the PVC pipes as the dog walks through the station, creating a stroking or petting sensation.

Each PVC pipe on the width-adjusting pieces (1, 2, 3, and 4) and the height-adjusting side pieces (5 and 6) contains seven comfort roller brushes. The brushes are arranged in an alternating pattern of large and small brushes: one large, one small, one large, one small, one large, one small, and one large brush.

The large comfort roller brushes measure 3.75 inches in length and 3 inches in width, with a 0.75-inch center hole that allows them to rotate freely on the PVC pipe. The small comfort roller brushes measure 3 inches in length and 2 inches in width, also featuring a 0.75-inch center hole.

This alternating pattern of brush sizes creates varied texture and pressure as the dog passes through the station, more closely mimicking the varied pressure and motion of a human hand petting the animal.

The Pet Comfort Station operates through a passive, self-activated mechanism. When a dog walks through the entrance of the device, its body contacts the comfort roller brushes positioned on the sides (from the width-adjusting PVC pipes) and on top (from the height-adjusting side PVC pipes). As the dog moves forward through the station, the contact with its body causes the roller brushes to rotate on their PVC pipe supports.

This rotation creates a stroking motion along the dog's fur and body, from head to tail as the animal walks through. The brushes on the sides provide comfort to both sides of the dog's body simultaneously, while the top brushes stroke the dog's back and upper body. The alternating sizes of the roller brushes create a varied, more natural sensation that mimics the irregular pressure patterns of human petting.

The adjustability of the device ensures that dogs of various sizes can use the station comfortably. For smaller dogs, the width can be decreased by moving the width-adjusting pieces inward, and the height can be lowered by repositioning the side pieces to lower cork mounting points. For larger dogs, the width can be increased and the height raised to ensure proper contact with the roller brushes without causing discomfort.

The device requires no electrical power or mechanical drive system, relying entirely on the dog's own movement through the station to activate the rotating comfort brushes. This passive operation makes the device safe, quiet, and maintenance-free, while the caster wheels allow the station to be easily moved to different locations within the home.

The Pet Comfort Station thus provides a simple yet effective means of offering physical comfort and soothing to dogs during periods when their owners are absent, potentially reducing separation anxiety and providing a calming activity for the pet.

FIG. 1A depicts the top frame 102 of the pet comfort station with its first layer of structural attachments 103. The top frame comprises a rectangular assembly of wood frame portions, each measuring six feet in length, 26.5 inches in width, and one inch in thickness.

The wood frame portions are joined at each corner to form a continuous rectangular perimeter that defines the upper boundary of the passage through which the animal walks.

The first attachment layer shown in FIG. 1A includes four wooden reinforcement blocks 106, one positioned at each corner of the top frame. Each wooden block measures 5.5 inches in length, 2.5 inches in width, and 1 inch in thickness. These blocks are secured to the top surface of the frame corners using Phillips flathead screws measuring 1.5 inches in length and 0.25 inches in thickness. The wooden blocks function as localized reinforcement pads that increase the bearing area at each corner joint, distributing mechanical loads across the frame corner and providing a secure mounting substrate for subsequent attachment of the vertical L-shaped wooden corner members and associated metal L-shaped brackets. This first attachment layer thus establishes the foundational connection points upon which all vertical structural elements of the pet comfort station are built.

Figure 1B:
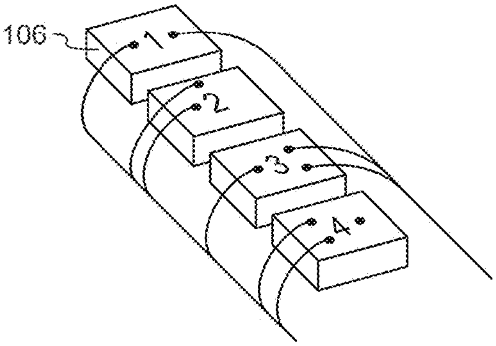

FIG. 1B depicts the top frame with its second layer of attachments and includes dimensional annotations. The second attachment layer comprises the metal L-shaped brackets that are coupled to the wood frame portions of the top frame to reinforce the corner joints and provide additional structural rigidity.

Each corner of the top frame receives one 2.5-inch L-shaped metal bracket and one 2-inch L-shaped metal bracket on both the front and back sides of the frame. Each metal L-shaped bracket is secured using four screws measuring 0.5 inches in length and 0.125 inches in thickness. In total, thirty-two screws secure the metal L-shaped brackets to each side (front and back) of the top frame, amounting to sixty-four screws total for the top frame. The metal L-shaped brackets function as rigid gussets that resist angular deflection at each corner joint, maintaining the rectangular geometry of the top frame under load. The dimensional annotations shown in FIG. 1B confirm the overall six-foot length of the frame members and the placement dimensions of the wooden blocks and brackets relative to the frame corners.

FIG. 1C depicts the bottom frame with its first layer of attachments and dimensional annotations. The bottom frame is constructed from wood frame portions sharing the same dimensions as the top frame: six feet in length, 26.5 inches in width, and one inch in thickness. The bottom frame forms the lower boundary of the passage and rests on the ground surface (or upon caster wheels as shown in FIG. 1F).

The first attachment layer of the bottom frame includes three wooden blocks per corner on the top side of the frame, totaling twelve blocks. Each block measures 5.5 inches in length, 2.5 inches in width, and 1 inch in thickness. These blocks are secured using Phillips flathead screws measuring 3.5 inches in length and 0.25 inches in thickness. The use of three blocks per corner on the bottom frame, as compared to one block per corner on the top frame, provides a more robust support system on the bottom frame. This increased reinforcement reflects the greater mechanical demands placed on the bottom frame, which must bear the weight of the entire assembled device, resist lateral forces generated as the animal walks through the passage, and support the mounting of caster wheels on its underside. The longer 3.5-inch screws used on the bottom frame, as compared to the 1.5-inch screws on the top frame, penetrate through multiple block layers and into the frame wood to establish a deeper, more secure mechanical fastening.

FIG. 1D depicts the bottom frame with its second layer of attachments and dimensions.

This second layer includes the metal L-shaped brackets applied to the bottom frame in a configuration mirroring that of the top frame. Each corner of the bottom frame receives one 2.5-inch metal L-shaped bracket and one 2-inch metal L-shaped bracket on both front and back sides. These brackets are secured with 0.5-inch screws, four per bracket, totaling sixty-four screws for the complete bottom frame bracket installation. Additionally, FIG. 1D shows the underside wooden blocks, two per corner, totaling eight blocks, that are mounted to the ground-facing surface of the bottom frame. These blocks share the same 5.5×2.5×1 inch dimensions and are secured with 3-inch-long Phillips flathead screws measuring 0.25 inches in thickness. These underside blocks serve as elevated mounting platforms for the caster wheels and as ground-contact pads that distribute the weight of the device across the floor surface.

Figure 1E:
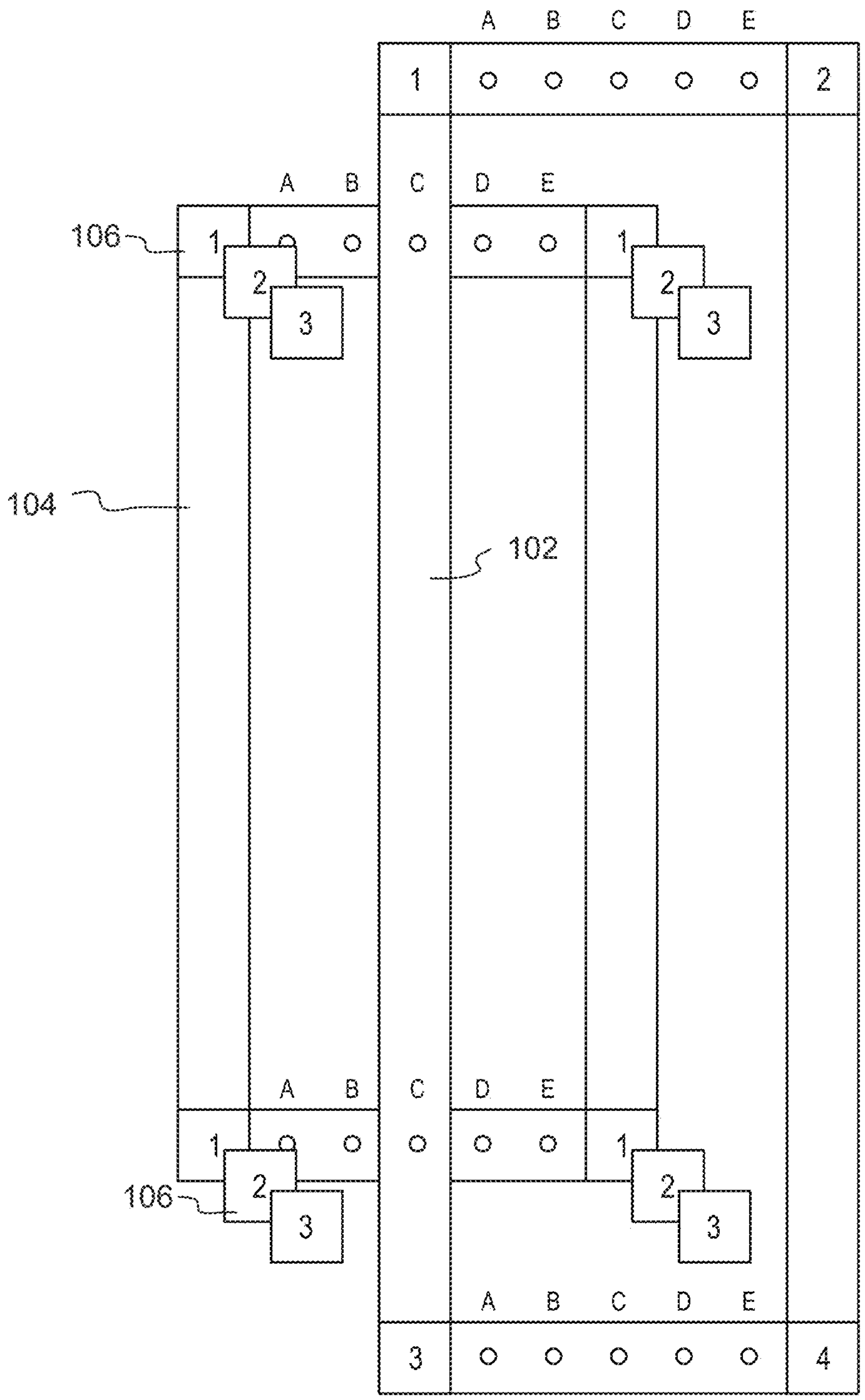
Figure 1F:
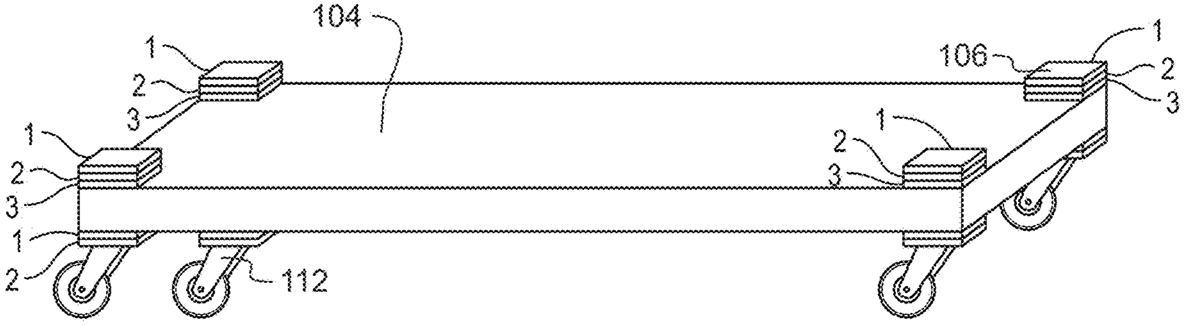

FIG. 1E depicts the top frame and the bottom frame together, each shown with their second attachment layers (metal L-shaped brackets) installed. This view illustrates the spatial relationship between the top and bottom frames before the vertical L-shaped wooden corner members are attached. The top frame is positioned above and parallel to the bottom frame, defining the general outline of the passage through which the animal will walk. FIG. 1E demonstrates that the top and bottom frames are structurally identical in plan-view geometry but differ in their reinforcement configurations (one block per corner on the top frame versus three blocks per corner and two underside blocks per corner on the bottom frame). This view serves as an intermediate assembly reference showing the state of the device prior to coupling the frames with vertical corner members and installing the adjustable wood members, transverse PVC pipe members, and comfort roller brushes.

FIG. 1F depicts a side profile view of the bottom frame showing the ground-side wooden blocks and the four rubber caster wheels 112. Each caster wheel is mounted to the second wooden block (block number two) on the ground side of each corner. The caster wheels include a flat metal mounting plate containing four screw holes. Each wheel is secured to its respective wooden block using Phillips flathead screws measuring 4.5 inches in length and 0.25 inches in thickness. Each caster wheel features a swivel mechanism that permits 360-degree rotation for omnidirectional movement of the pet comfort station across a floor surface. Each caster wheel further includes a locking device or brake mechanism configured to selectively inhibit movement of the pet comfort station, as recited in the claims. The locking mechanism functions by engaging a friction element against the wheel surface when actuated, preventing the wheel from rotating and thereby immobilizing the device at a selected location. This locking feature ensures that the pet comfort station remains stationary while the animal walks through the passage, preventing unwanted displacement caused by the animal's contact with the comfort roller brushes.

Figure 2:
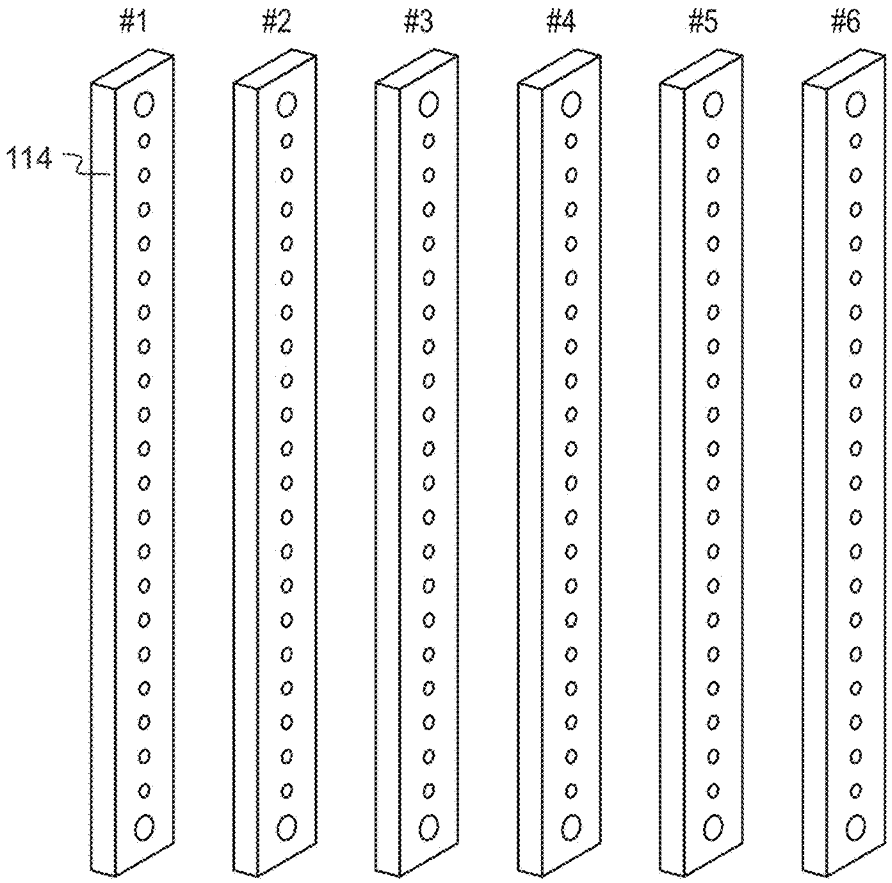
FIG. 2 illustrates the six adjustable wooden pieces, each 6 feet tall by 3 inches wide by 1 inch thick, with twenty ¾-inch diameter holes along their length.

FIG. 2 illustrates the six adjustable wood members 114 that constitute the height and width adjustment system of the pet comfort station. Each adjustable wood member measures six feet in height (length), three inches in width, and one inch in thickness. Each adjustable wood member includes twenty evenly-spaced holes, each measuring 0.75 inches in diameter. These holes are configured to receive 0.75-inch-diameter PVC pipes (the transverse members) that support the comfort roller brushes.

The holes at each end of each adjustable wood member are specifically dimensioned to accommodate cork mounting pieces that serve as spacers and attachment interfaces between the adjustable wood members and the top frame, bottom frame, or vertical L-shaped wooden corner members.

Of the six adjustable wood members, four members (designated as adjustable pieces 1, 2, 3, and 4) are configured to control the width of the passage through the pet comfort station. Adjustable pieces 1 and 3 are associated with the top frame, and adjustable pieces 2 and 4 are associated with the bottom frame. These width-adjusting members can be repositioned laterally, inward toward the center of the device to decrease the passage width, or outward to increase the passage width, thereby accommodating animals of varying body widths, as recited in the claims.

The remaining two adjustable wood members (designated as adjustable pieces 5 and 6) are configured to control the height of the top comfort roller brushes relative to the bottom frame. These side members are coupled to the vertical L-shaped wooden corner members and can be repositioned vertically to raise or lower the top array of transverse PVC pipe members and their associated comfort roller brushes. This vertical repositioning ensures proper contact between the top comfort roller brushes and the dorsal surface of animals of varying heights.

The twenty holes in each adjustable wood member provide discrete positional settings for the PVC pipes. By inserting the PVC pipes into different holes, the spacing and coverage area of the comfort roller brushes can be configured to match the size of the animal using the station. This multi-hole configuration provides fine-grained adjustability across a wide range of animal sizes.

Figure 3:
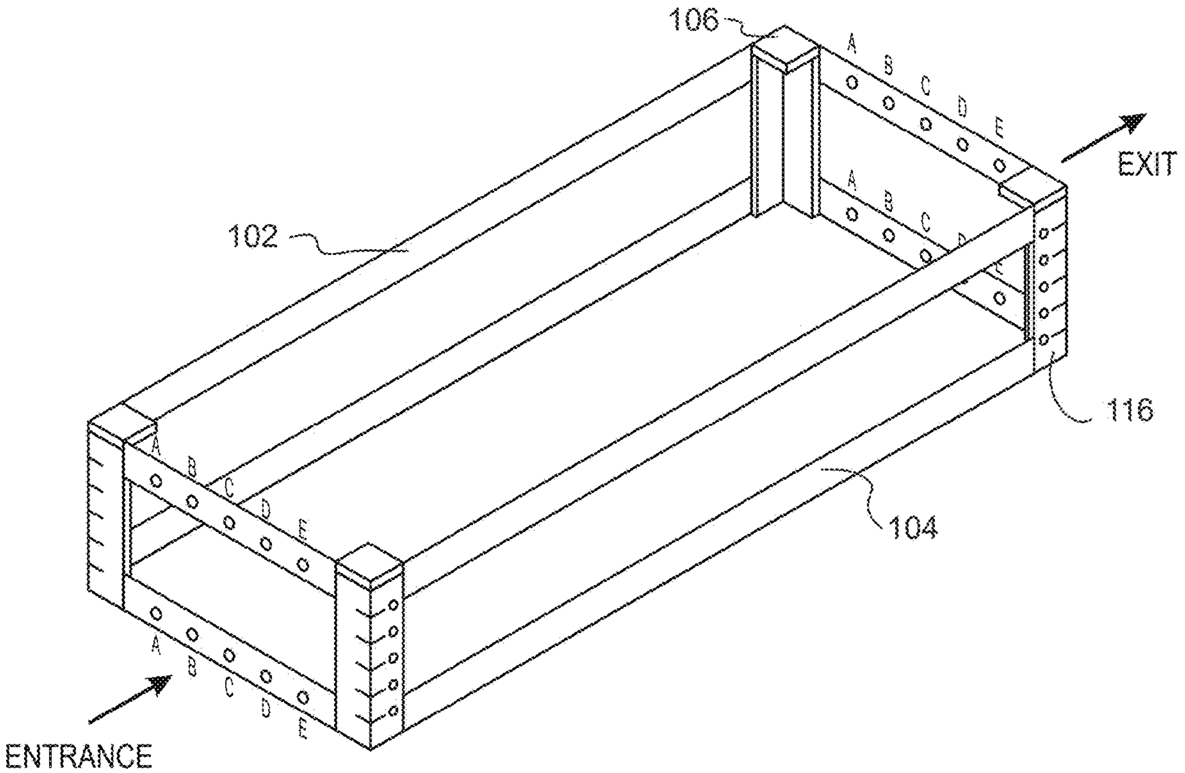
FIG. 3 shows the basic frame structure with top and bottom frames connected by vertical L-shaped corner pieces and metal brackets, without roller assemblies.

FIG. 3 shows the basic frame structure of the pet comfort station comprising the top frame and the bottom frame connected by the four vertical L-shaped wooden corner members 116, with the metal L-shaped brackets visible at the frame corners. No roller assemblies (PVC pipes, comfort roller brushes, or adjustable wood members) are installed in this view.

Each vertical L-shaped wooden corner member measures 30 inches in length, 3 inches in width, and 1 inch in thickness. These corner members are attached to both the top and bottom frames using metal L-shaped brackets. Five 2.5-inch L-shaped brackets per corner support each vertical wooden corner member, with each bracket secured using twenty 0.25-inch screws per corner. Additionally, each vertical corner member is fastened directly to the frame blocks using Phillips flathead screws measuring 0.5 inches in length and 0.25 inches in thickness, with two screws securing each corner to the top frame and two screws securing each corner to the bottom frame.

The L-shaped cross-sectional profile of each vertical corner member creates a structural channel at each corner of the device. This channel configuration performs multiple functions: it resists torsional and lateral forces that could cause the frame to rack or deform; it creates a defined rectangular opening at each end of the device that serves as the entrance and exit points for the animal; and it provides interior mounting surfaces on which cork mounting pieces and adjustable wood members (pieces 5 and 6) can be installed.

FIG. 3 thus depicts the primary structural skeleton of the pet comfort station, demonstrating the load-bearing framework to which all adjustable and comfort-providing components are subsequently attached.

Figure 4:
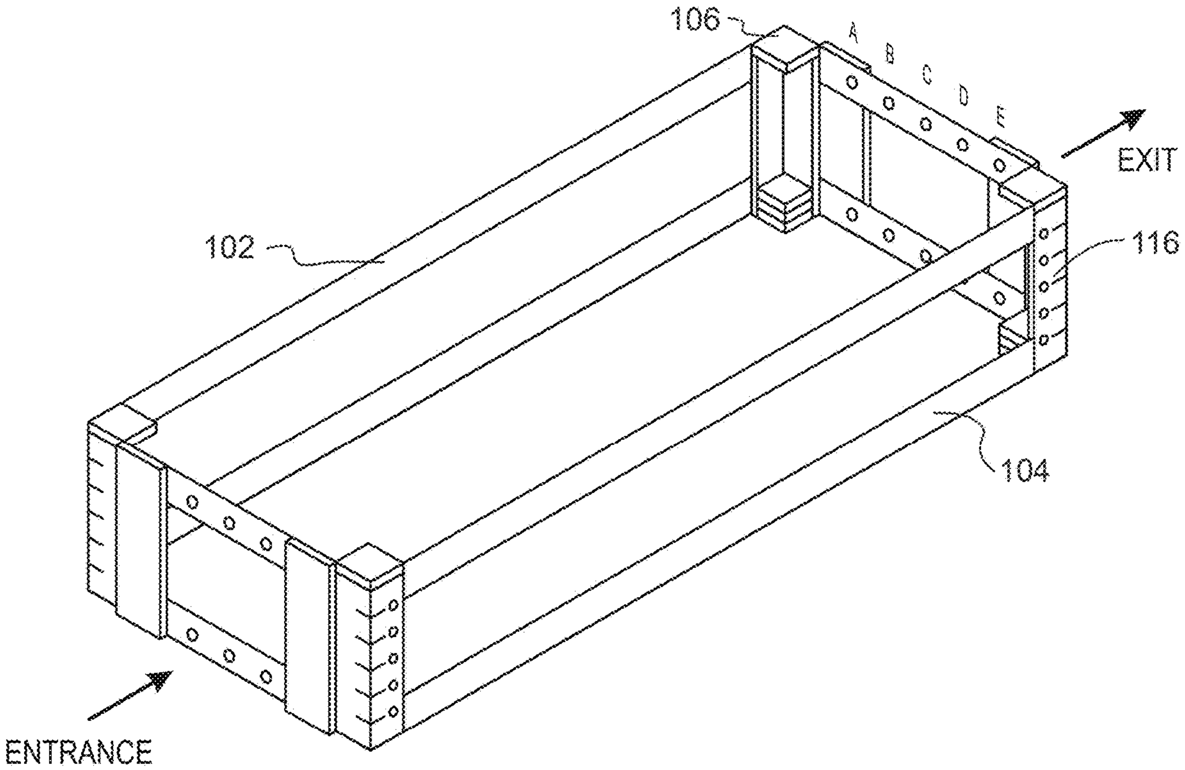
FIG. 4 depicts the frame assembly with vertical corner pieces and adjustable wooden pieces installed, showing adjustment holes and cork mounting locations.

FIG. 4 depicts the frame assembly of FIG. 3 with the vertical corner members and the adjustable wood members installed. This view shows the adjustment holes in the adjustable wood members and the cork mounting locations on the frames and corner members.

The adjustable wood members are shown coupled to the top frame, bottom frame, and vertical L-shaped wooden corner members through the cork mounting system. Each frame (top and bottom) features five cork mounting locations, labeled A through E. At each cork location, two cork pieces are positioned, each measuring 1 inch in height and 0.75 inches in circumference. Each cork assembly is secured using a Phillips flathead screw measuring 2.5 inches in length and 0.25 inches in thickness, which passes through the center of the cork pieces. A 0.25-inch nut secures the screw-and-cork assembly from the visible side of the frame. This creates ten total screw-and-cork assemblies on each frame (five locations×two cork pieces per location).

The vertical L-shaped wooden corner members contain cork mounting points for the side adjustable wood members (pieces 5 and 6). These corners feature five cork locations labeled F through J on the inside surface of each L-shaped corner. Each cork location contains two cork pieces with the same dimensions as those on the frames. The cork assemblies on the corner members are secured identically, with 2.5-inch screws and 0.25-inch nuts.

The cork pieces function as combined spacer and attachment elements. As spacers, they maintain a precise standoff distance between the adjustable wood member and the frame or corner member surface, creating clearance for PVC pipe insertion and comfort roller brush rotation. As attachment elements, the cork pieces frictionally engage the surfaces of the adjustable wood members and the frame or corner members when the screw-and-nut fastener is tightened, clamping the adjustable wood member in position at the selected cork location.

By repositioning the adjustable wood members at different cork locations, the user can modify the device's passage dimensions. For maximum height, adjustable pieces 5 and 6 are placed at cork location F (the uppermost position on the vertical corner members). For minimum height, pieces 5 and 6 are placed at cork location J (the lowermost position). Similarly, moving the width-adjusting pieces (1, 2, 3, and 4) between cork locations A through E adjusts the passage width from maximum to minimum.

Figure 4A:
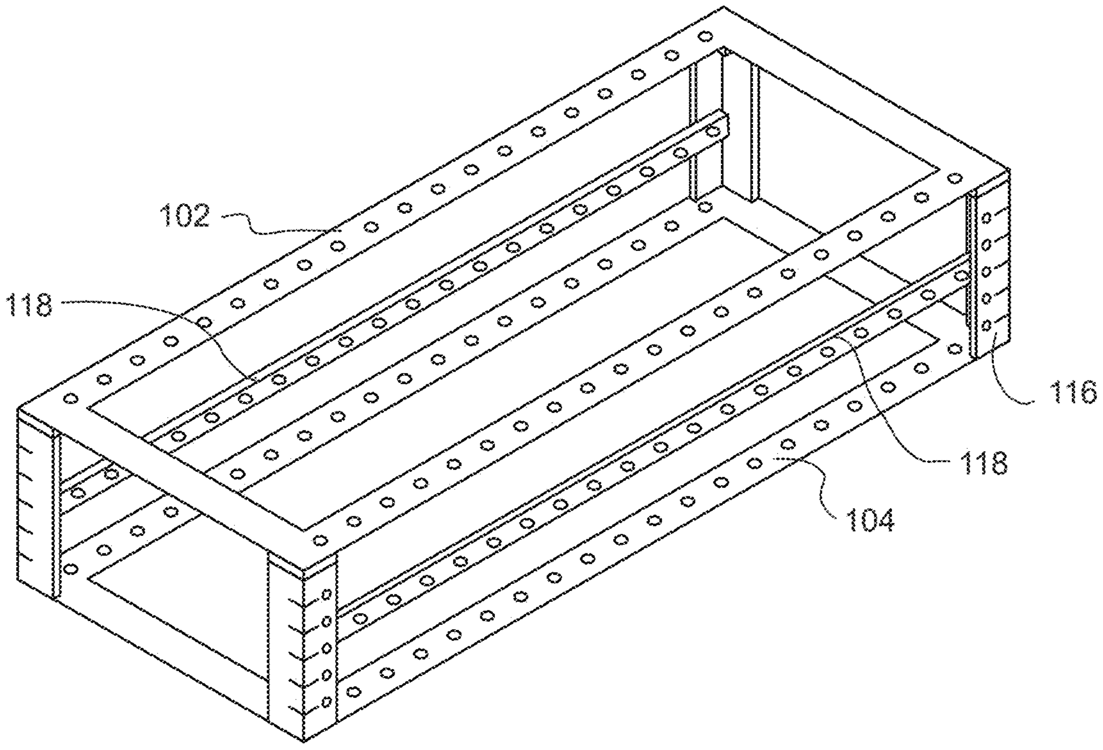

FIG. 4A shows a top plan view of the L-shaped wooden corner pieces and their associated cork mounting pieces 118. This view reveals the spatial arrangement of the cork pieces on the interior surfaces of the L-shaped corners, showing how the cork mounting points are distributed along the vertical extent of each corner member. The top plan perspective demonstrates the L-shaped cross-section of the corner members and illustrates how the interior surfaces of the L-shape face inward toward the passage, providing mounting surfaces for the adjustable wood members (pieces 5 and 6) that control the height of the top comfort roller brushes.

Figure 4B:
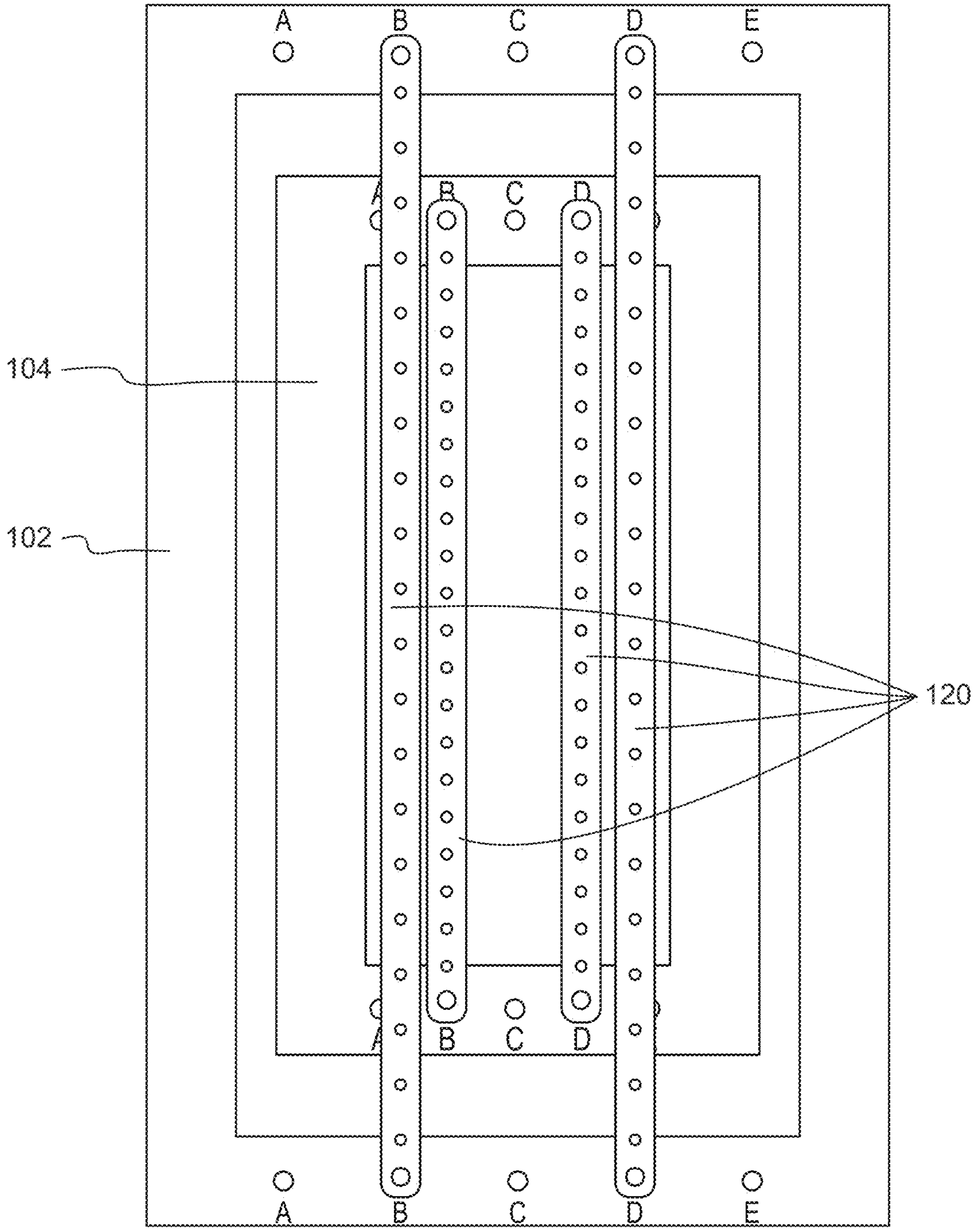

FIG. 4B depicts the four width-adjusting wood members 120 in detail, showing the twenty 0.75-inch-diameter holes formed along the length of each member and the cork mounting pieces at the ends. The holes are configured to receive the 0.75-inch-diameter PVC pipe transverse members. The cork pieces at each end of the wood members interface with the cork mounting locations on the top and bottom frames, enabling lateral repositioning of these members to adjust the passage width.

This view illustrates the relationship between the PVC pipe receiving holes and the cork mounting system: the holes provide the positional options for the transverse PVC pipe members (and thereby the comfort roller brushes), while the cork mounting system provides the positional options for the adjustable wood members themselves relative to the frame.

Together, these two adjustment mechanisms provide a two-dimensional adjustment capability, the position of the adjustable wood member on the frame determines the lateral position of the brush array, while the selection of which holes receive PVC pipes determines the vertical distribution of brushes within that array.

Figure 5:
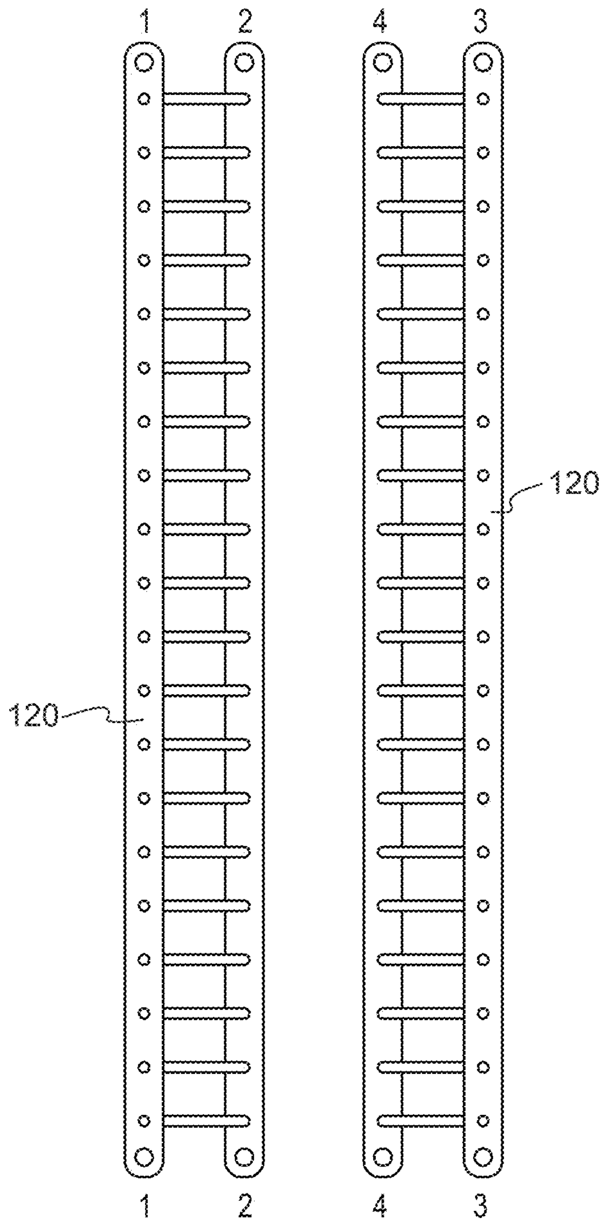
FIG. 5 shows the four width-adjusting pieces with PVC pipes installed vertically between paired pieces, with a detail of pipe insertion.

FIG. 5 shows the four width-adjusting wood members 120 with PVC pipes installed between paired members. Twenty PVC pipes extend vertically between adjustable wood pieces 1 and 2 on one side of the passage, and twenty PVC pipes extend between pieces 3 and 4 on the opposite side. Each PVC pipe measures 33.5 inches in length and 0.75 inches in diameter.

A detail inset in FIG. 5 depicts the insertion of a PVC pipe into one of the 0.75-inch-diameter holes in an adjustable wood member, showing how the pipe passes through the hole in one member of a pair and terminates at or through the corresponding hole in the opposing member. The PVC pipes are retained in position by PVC caps coupled to each end of the pipe. The caps fit over the exposed pipe ends outside the adjustable wood members, preventing the pipe from sliding axially through the holes and thereby maintaining the structural connection between paired adjustable wood members.

The PVC pipes function as the transverse members recited in the claims. They serve as both structural cross-braces that maintain the spacing between paired adjustable wood members and as axle supports upon which the comfort roller brushes are mounted and rotate. The 33.5-inch length of the width-adjusting PVC pipes spans the distance between the paired adjustable wood members at their installed positions, ensuring that the comfort roller brushes mounted thereon are positioned to contact the side surfaces of the animal as it walks through the passage.

Figure 6:
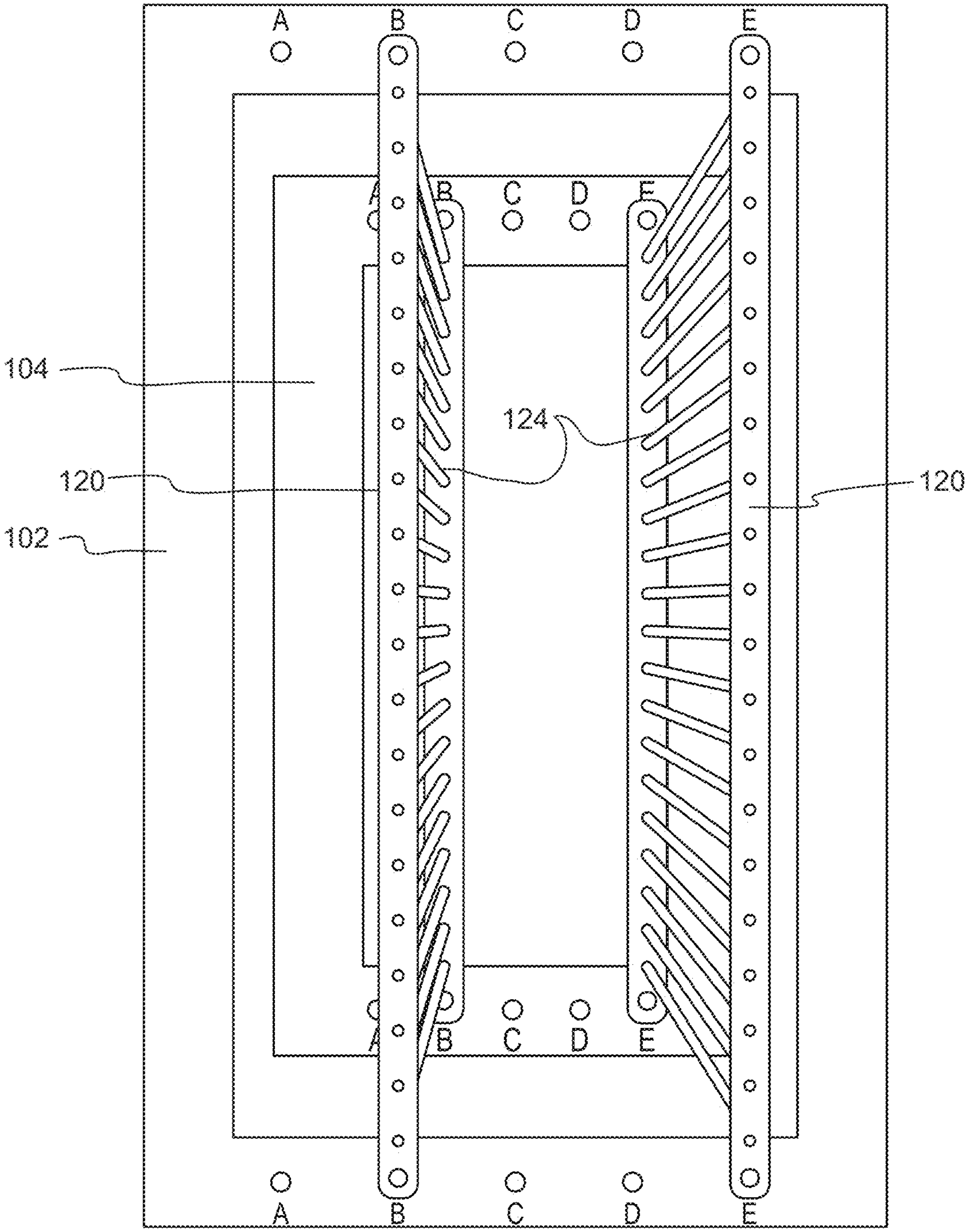
FIG. 6 presents a top plan view showing twenty PVC pipes.

FIG. 6 presents a top plan view of the assembled pet comfort station showing the top 102 and bottom frames 104, the arrangement of PVC pipes 124 and the adjustable wood members 120. This overhead perspective reveals the distribution pattern of the transverse PVC pipe members between the width-adjusting pieces.

From this top view, twenty PVC pipes are visible extending between height-adjusting side pieces 5 and 6 across the top of the passage. These top PVC pipes measure 32 inches in length and 0.75 inches in diameter. The comfort roller brushes are shown mounted on the PVC pipes in the alternating large-small pattern. Additionally, the width-adjusting PVC pipe arrays on each side of the passage are visible, showing the lateral arrangement of the side-mounted comfort roller brush assemblies.

FIG. 6 demonstrates the overall coverage pattern of comfort roller brushes within the passage. The top brush array provides continuous coverage across the dorsal (back and upper body) surface of the animal, while the side brush arrays provide simultaneous coverage along both lateral surfaces of the animal. This three-surface coverage pattern (top, left side, and right side) ensures that the animal receives comprehensive comfort stimulation as it walks through the passage, mimicking the sensation of being petted by human hands on all accessible body surfaces simultaneously.

Figure 7:
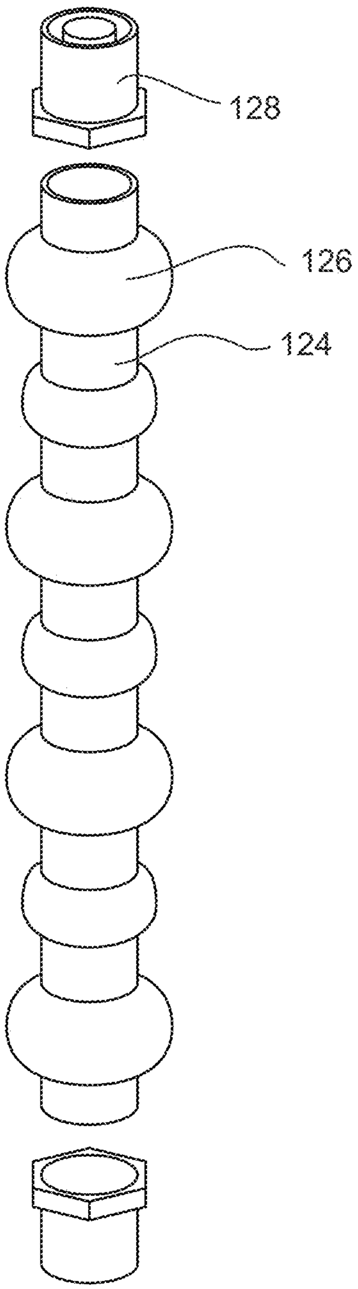
FIG. 7 shows a magnified view of one PVC pipe with caps and seven alternating large and small comfort roller brushes which are installable on the PVC pipes depicted in FIG. 6, and shown installed in FIG. 9.

FIG. 7 shows a magnified view of a single PVC pipe assembly comprising the PVC pipe 124, two PVC end caps 128, and seven comfort roller brushes 126 mounted on the pipe. This figure illustrates in detail the comfort-providing sub-assembly that is the primary functional element of the pet comfort station.

The PVC pipe is shown with a PVC cap secured to each end. The caps are configured to fit over the pipe ends and serve the dual purpose of retaining the PVC pipe relative to the adjustable wood members and containing the comfort roller brushes within the active section of the pipe between the adjustable wood members.

The seven comfort roller brushes are arranged on the PVC pipe in an alternating pattern: large brush, small brush, large brush, small brush, large brush, small brush, large brush. This yields four large brushes and three small brushes per pipe.

The large comfort roller brushes measure 3.75 inches in length and 3 inches in width (outer diameter), with a 0.75-inch center hole that corresponds to the outer diameter of the PVC pipe. The center hole allows each large brush to rotate freely about the PVC pipe axis when contacted by the animal's body. The small comfort roller brushes measure 3 inches in length and 2 inches in width (outer diameter), also featuring a 0.75-inch center hole for free rotation on the PVC pipe.

The comfort roller brushes are similar in design to paint roller brushes and feature a cylindrical brush surface composed of soft fibers or nap material that contacts the animal's fur and skin. When the animal walks through the passage and its body contacts the brush surfaces, the frictional engagement between the animal's moving body and the stationary brush surface causes each brush to rotate on the PVC pipe. This rotation generates a stroking motion along the animal's fur in the direction of travel, mimicking the sensation of a human hand petting or rubbing the animal.

The alternating pattern of large and small brushes creates a varied texture and pressure profile along each PVC pipe. The large brushes, having a greater outer diameter, extend further from the pipe axis and contact the animal with a broader surface area and at a greater radial distance. The small brushes, having a lesser outer diameter, contact the animal at points closer to the pipe axis. This variation in contact diameter and surface area produces irregular pressure patterns and varied tactile sensations as the animal passes through the station, more closely approximating the varied, non-uniform pressure and motion of a human hand petting the animal than a uniform brush arrangement would achieve.

Figure 8:
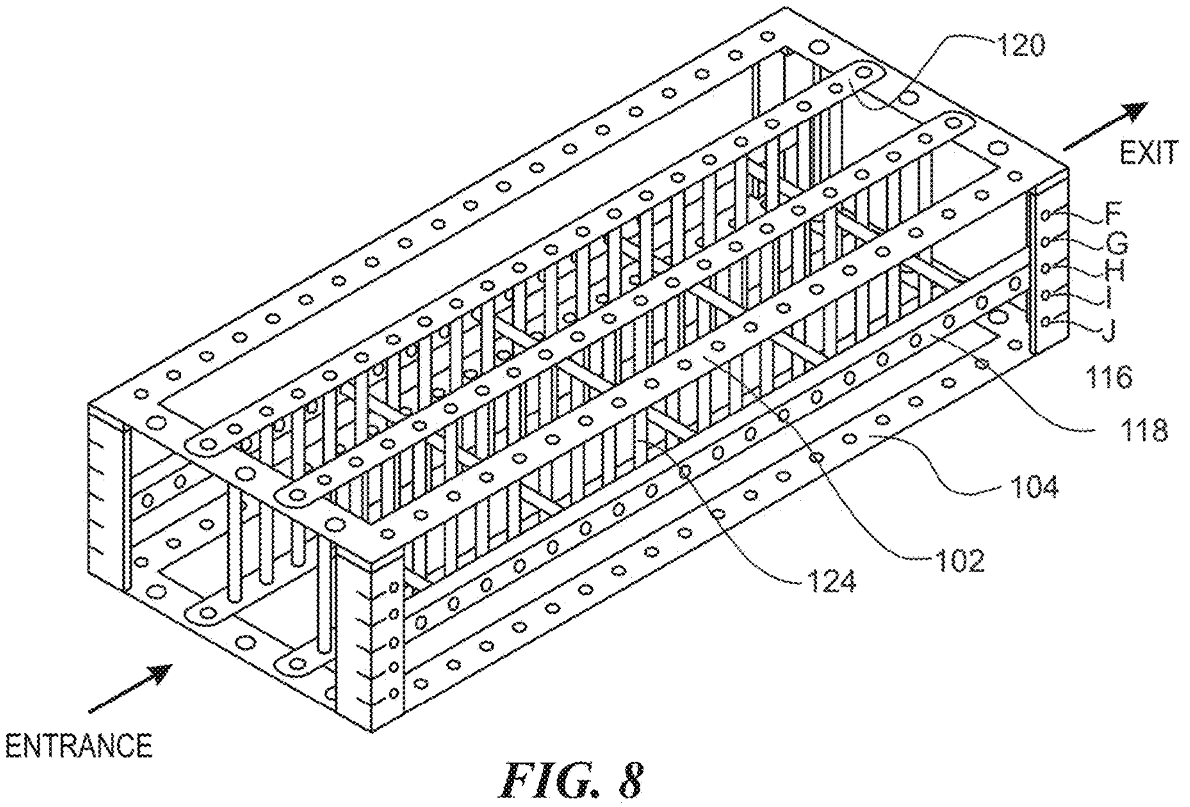
FIG. 8 provides a comprehensive perspective view of the device without brushes installed.

FIG. 8 shows the six adjustable wood members with their associated PVC pipes and PVC caps, depicted in isolation without the surrounding frame structure (top frame, bottom frame, vertical corner members, and brackets). This sub-assembly view illustrates the comfort-providing module of the pet comfort station as an independent unit.

The four width-adjusting members (pieces 1-4) are shown in paired configuration, with twenty PVC pipes extending between pieces land 2 and twenty PVC pipes extending therebetween pieces 3 and 4. Each PVC pipe carries alternate large and small comfort roller brushes. The height-adjusting side members (pieces 5 and 6) are shown with the potential to support twenty PVC pipes extending between the top of the passage, each pipe has the capacity to carry seven comfort roller brushes.

This view demonstrates the three-dimensional brush coverage architecture of the device: the side brush arrays formed by the width-adjusting member pairs create two vertical curtains of rotating brushes on either side of the passage, while the top brush array formed by the height-adjusting side members creates a horizontal canopy of rotating brushes above the passage. When an animal of appropriate size walks through the passage, its body simultaneously contacts the side brush curtains and the top brush canopy, receiving comfort stimulation on its left side, right side, and dorsal surface in a single pass through the station.

Figure 9:
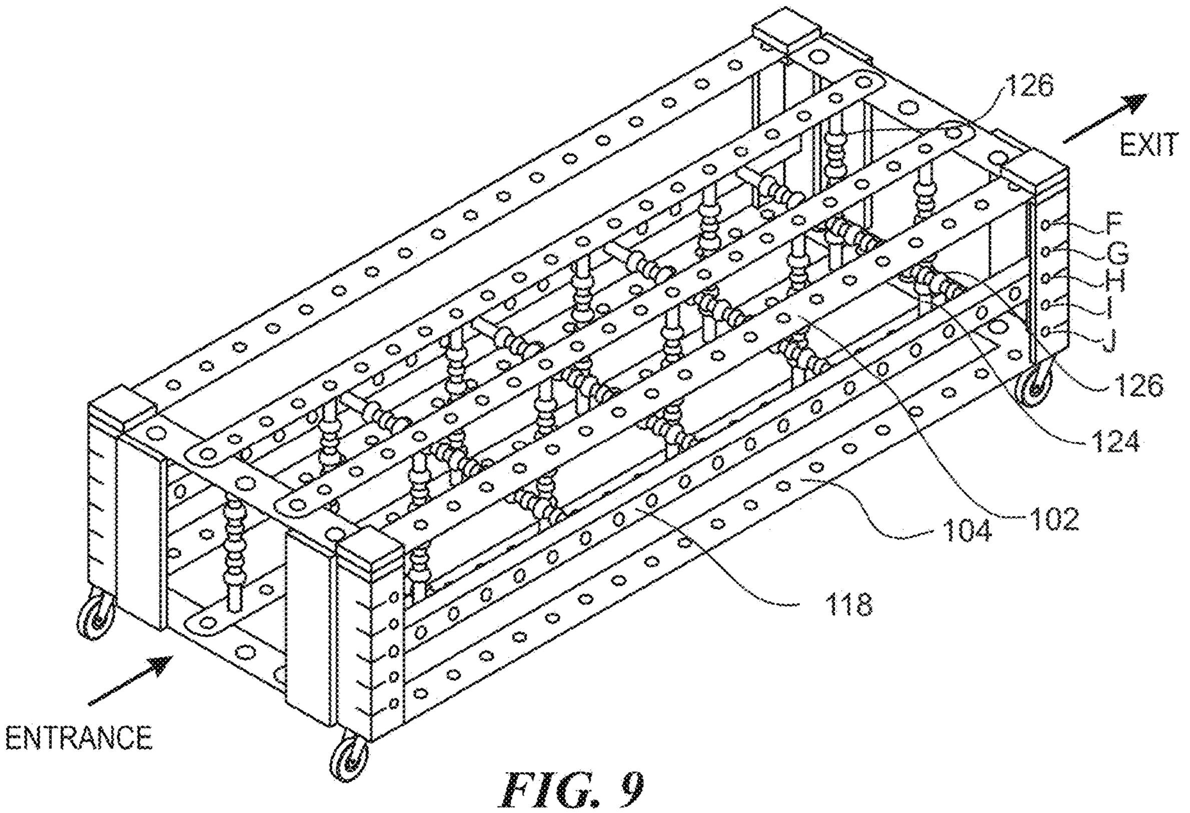
FIG. 9 presents a top perspective view of the fully assembled station showing all components, hardware, and marked entrance and exit.

FIG. 9 presents a perspective view of the fully assembled Pet Comfort Station showing all visible components, hardware, and the designated entrance and exit of the passage. This figure represents the complete pet comfort station as it would appear when assembled, adjusted, and ready for use.

All structural components are visible in this view: the top frame and bottom frame with their reinforcement blocks and metal L-shaped brackets; the four vertical L-shaped wooden corner members coupling the top and bottom frames; the caster wheels on the underside of the bottom frame; the six adjustable wood members installed at selected cork mounting locations; the PVC pipe transverse members extending between paired adjustable wood members; the PVC end caps retaining the pipes; and the comfort roller brushes in their alternating large-small arrangement on each PVC pipe.

The entrance and exit of the passage are clearly indicated, showing the open rectangular apertures at each end of the device through which the animal enters and exits. The passage defined between the top frame, bottom frame, and side brush arrays is configured such that when the animal enters through one end and walks through to the opposite end, its body contacts the comfort roller brushes positioned on the sides and top of the passage. The passive, self-activated operation of the device is apparent from this view: no motors, electrical components, or mechanical drive systems are present. The comfort roller brushes rotate solely due to frictional contact with the moving animal, requiring no external power source.

The assembled device as shown in FIG. 9 is configured for a specific animal size based on the selected positions of the adjustable wood members. By repositioning the width-adjusting members (pieces 1-4) at different cork locations (A through E) on the top and bottom frames, and by repositioning the height-adjusting side members (pieces 5 and 6) at different cork locations (F through J) on the vertical corner members, the device can be reconfigured to accommodate animals of different sizes, as recited in the claims.

What is claimed is:

1. An animal comfort station, comprising:
- a bottom frame defining a passage configured for an animal to walk through;
- a top frame positioned above the bottom frame;
- a plurality of adjustable frame members configured to couple the top frame to the bottom frame and to adjust at least one of (i) a height of the top frame relative to the bottom frame or (ii) a width of the passage;
- a plurality of transverse members comprising PVC pipes supported by at least one of the top frame or the adjustable frame members, each PVC pipe including a cap at each end configured to secure the PVC pipe relative to at least one of the adjustable frame members;
- a plurality of comfort roller elements mounted to the transverse members and positioned to contact at least one of a top surface or side surfaces of the animal while the animal walks through the passage; and
- a plurality of cork pieces secured to at least one of the top frame or the bottom frame, the cork pieces being configured to define at least one of spacer locations or attachment locations for the adjustable frame members.

2. The animal comfort station of claim 1, wherein the top frame and the bottom frame each comprise wood.

3. The animal comfort station of claim 1, wherein the PVC pipes are received through respective holes formed in the adjustable frame members.

4. The animal comfort station of claim 3, wherein the cap on each end of each PVC pipe comprises a PVC cap fitted over a respective end of the PVC pipe.

5. The animal comfort station of claim 1, wherein the comfort roller elements comprise paint-roller-type brushes mounted along a respective transverse member.

6. The animal comfort station of claim 1, wherein the bottom frame includes caster wheels configured to permit movement of the animal comfort station across a floor surface.

7. The animal comfort station of claim 6, wherein the caster wheels comprise locking caster wheels configured to selectively inhibit movement of the animal comfort station.

8. An animal comfort station, comprising:
- a top frame comprising a plurality of wood frame portions;
- a bottom frame comprising a plurality of wood frame portions;
- a plurality of L-shaped brackets coupling wood frame portions of the top frame to one another and coupling wood frame portions of the bottom frame to one another;
- a plurality of vertical wood corner members coupling the top frame to the bottom frame;
- a first plurality of adjustable wood members configured to adjust a width of the animal comfort station and a second plurality of adjustable wood members configured to adjust a height of the animal comfort station;
- a plurality of PVC pipes each received through respective holes formed in at least one of the first plurality of adjustable wood members or the second plurality of adjustable wood members;
- a plurality of caps coupled to ends of the PVC pipes to retain the PVC pipes relative to the at least one of the first plurality of adjustable wood members or the second plurality of adjustable wood members through which the PVC pipes are received; and
- a plurality of comfort roller brushes mounted on the PVC pipes and positioned to contact an animal passing through the animal comfort station.

9. The animal comfort station of claim 8, wherein each adjustable wood member of the first plurality of adjustable wood members and the second plurality of adjustable wood members includes a plurality of spaced holes that include the respective holes through which the PVC pipes are received, and wherein the PVC pipes are positionable in different ones of the plurality of spaced holes to set at least one of the width or the height.

10. The animal comfort station of claim 8, further comprising cork pieces secured to at least one of the top frame, the bottom frame, or the vertical wood corner members, the cork pieces being configured to define at least one of spacer locations or attachment locations for fasteners.

11. The animal comfort station of claim 10, wherein at least one cork piece is secured using a screw passing through a center of the cork piece and retained with a nut.

12. The animal comfort station of claim 8, wherein the comfort roller brushes on a given PVC pipe include brushes of at least two different sizes.

13. The animal comfort station of claim 8, wherein the bottom frame further comprises a plurality of caster wheels secured to the bottom frame.

14. The animal comfort station of claim 8, wherein the L-shaped brackets comprise metal L-shaped brackets secured using screws.

15. A method of providing comfort to an animal using an animal comfort station, the method comprising:

positioning a top frame above a bottom frame to define a passage for an animal to walk through;

adjusting, using adjustable frame members that couple the top frame to the bottom frame, at least one of (i) a height of the top frame relative to the bottom frame or (ii) a width of the passage to accommodate a size of the animal, wherein the adjustable frame members are coupled to at least one of the top frame or the bottom frame through cork pieces that define spacer locations or attachment locations for the adjustable frame members;

supporting a plurality of transverse members comprising PVC pipes on at least one of the top frame or the adjustable frame members;

securing a cap to each end of at least one PVC pipe of the PVC pipes to retain the PVC pipe in a selected position relative to the adjustable frame members;

mounting a plurality of comfort roller elements on the PVC pipes such that at least one comfort roller element is positioned to contact a top of the animal and at least one comfort roller element is positioned to contact a side of the animal; and permitting the animal to walk through the passage such that the comfort roller elements rotate due to contact with the animal to soothe the animal.

16. The method of claim 15, wherein adjusting the width comprises moving at least one of the adjustable frame members inward toward a center of the animal comfort station to decrease the width.

17. The method of claim 15, wherein mounting the comfort roller elements comprises mounting comfort roller brushes on the PVC pipes.

18. The method of claim 15, wherein the cap secured to each end of at least one PVC pipe comprises a PVC cap fitted over a respective end of the PVC pipe.

19. The method of claim 15, further comprising moving the animal comfort station on caster wheels to a selected location prior to permitting the animal to walk through the passage.

20. The method of claim 19, further comprising locking at least one caster wheel to inhibit movement of the animal comfort station while the animal walks through the passage.

* * * * *